United States Patent
Takeuchi (10) Patent No.: US 10,518,979 B2
(45) Date of Patent: Dec. 31, 2019

(54) WIRE DRIVE CONVEYING APPARATUS

(71) Applicant: TOYOTA JIDOSHA KABUSHIKI KAISHA, Toyota-shi, Aichi-ken (JP)

(72) Inventor: Sadamu Takeuchi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 16/378,908

(22) Filed: Apr. 9, 2019

(65) Prior Publication Data
US 2019/0367285 A1    Dec. 5, 2019

(30) Foreign Application Priority Data
May 30, 2018    (JP) .................. 2018-103534

(51) Int. Cl.
| | | |
|---|---|---|
| B65G 23/14 | (2006.01) | |
| B65G 17/12 | (2006.01) | |
| B65G 23/44 | (2006.01) | |
| B61B 9/00 | (2006.01) | |
| B65G 17/14 | (2006.01) | |

(52) U.S. Cl.
CPC .............. B65G 23/14 (2013.01); B61B 9/00 (2013.01); B65G 17/12 (2013.01); B65G 17/14 (2013.01); B65G 23/44 (2013.01)

(58) Field of Classification Search
CPC .... B65G 17/12; B65G 17/123; B65G 17/126; B65G 17/14; B65G 23/14; B65G 23/44; B65G 35/06; B61B 9/00
USPC ........................................................ 198/815
See application file for complete search history.

(56) References Cited

U.S. PATENT DOCUMENTS

| | | | | |
|---|---|---|---|---|
| 325,004 | A * | 8/1885 | Miller ................. | B61B 9/00 104/196 |
| 1,499,319 | A * | 6/1924 | Reid, Jr. ............... | B65G 23/36 198/835 |
| 2,633,977 | A * | 4/1953 | McMillan .............. | B65G 23/44 198/815 |
| 3,326,355 | A * | 6/1967 | Phillips ................. | B65G 23/44 198/815 |
| 3,910,405 | A * | 10/1975 | Couperus ............... | B65G 15/16 198/626.4 |

(Continued)

FOREIGN PATENT DOCUMENTS

| | | | | |
|---|---|---|---|---|
| JP | 2016-199392 A | | 12/2016 | |
| JP | 2017165508 A | * | 9/2017 | ............ B65G 35/06 |
| JP | 2017-206217 A | | 11/2017 | |

*Primary Examiner* — Mark A Deuble
(74) *Attorney, Agent, or Firm* — Sughrue Mion, PLLC (57) ABSTRACT

A wire drive conveying apparatus is configured to cause a conveyance bogie to run along a guide rail by pulling a wire placed along the guide rail and formed to be endless when the opposite ends of the wire are connected to the conveyance bogie configured to slidably engage with the guide rail. The wire drive conveying apparatus includes: a movable trestle connected to a moving pulley configured to support the wire; a weight configured to pull the trestle in a direction in which a tensile force is given to the wire; a spring provided between the conveyance bogie and the trestle; and a locking mechanism configured to permit a movement of the trestle in the direction in which the tensile force is given to the wire and to prevent a movement of the trestle in a direction in which the wire is loosened.

7 Claims, 5 Drawing Sheets

(56) References Cited

U.S. PATENT DOCUMENTS

| | | | |
|---|---|---|---|
| 2013/0126307 A1* | 5/2013 | Stoeckle | B65G 19/24 198/619 |
| 2015/0021144 A1* | 1/2015 | Rhodes, II | B65G 35/06 198/469.1 |
| 2015/0030124 A1* | 1/2015 | Wu | B60S 13/00 378/57 |
| 2015/0321856 A1* | 11/2015 | De Goede | B65G 23/44 198/617 |

* cited by examiner

WIRE DRIVE CONVEYING APPARATUS

INCORPORATION BY REFERENCE

The disclosure of Japanese Patent Application No. 2018-103534 filed on May 30, 2018 including the specification, drawings and abstract is incorporated herein by reference in its entirety.

BACKGROUND

1. Technical Field

The disclosure relates to a wire drive conveying apparatus configured to pull a wire placed along a guide rail so that a conveyance bogie connected to the wire runs along the guide rail.

2. Description of Related Art

In the related art, there has been known a wire drive conveying apparatus configured when the opposite ends of a wire placed along a guide rail are connected to a conveyance bogie that slidably engages with the guide rail, so that the wire becomes endless, and the endless wire is pulled to cause the conveyance bogie to run along the guide rail.

In such a wire drive conveying apparatus, the wire largely stretches in the early stage of beginning of use, and the wire is stretched out due to aged deterioration after that. Accordingly, in order to restrain slack in the endless wire, it is necessary to automatically adjust stretch of the wire.

For example, Japanese Unexamined Patent Application Publication No. 2016-199392 (JP 2016-199392 A) discloses a wire-drive type conveying apparatus configured to absorb slack of an endless wire by an auto tensioner including a moving pulley over which the endless wire is provided, and a weight connected to the moving pulley.

SUMMARY

In the meantime, in the wire drive conveying apparatus, in a case where a running path (a guide rail) has a curve part, it is common to cause the wire to curve along the guide rail such that the wire is provided over a plurality of pulleys placed inside the curve part of the guide rail so as to fit the curve part. When a conveyance bogie passes the curve part, the conveyance bogie often runs such that the center line, of the conveyance bogie, where a connecting portion between the conveyance bogie and the wire is placed goes outside the pulleys, so that the connecting portion does not hit the pulleys.

When the conveyance bogie runs so that the center line goes outside the pulleys as such, a wire length is required by just that much (a difference between the length of the wire provided over the pulleys and a running path length of the conveyance bogie). In terms of this, in JP 2016-199392 A, at the time when the conveyance bogie passes the curve part, the moving pulley moves in a direction in which the wire is loosened, so that the wire is sent off, and thus, a necessary wire length is secured.

However, in JP 2016-199392 A, a weight is suddenly lifted along with the movement of the moving pulley in the direction in which the wire is loosened. As a result, the weight moves up and down after the conveyance bogie has passed the curve part, and when the weight moves down, the acceleration of gravity of the weight is added to the wire. This might damage the wire. Further, once the weight starts to move up and down, it takes time until the weight stands still. This requires time to stop the conveyance bogie, so that a stop of a conveyed object delays.

The disclosure provides a technique to automatically adjust stretch of a wire due to aged deterioration or the like in a wire drive conveying apparatus and to restrain a weight from moving up and down when a conveyance bogie passes a curved part of a guide rail.

In a wire drive conveying apparatus according to an aspect of the disclosure, a spring is provided at a position between a trestle configured to connect a moving pulley to a weight and a conveyance bogie, and due to extension of the spring, a wire length necessary for the conveyance bogie to pass a curve part is secured and a movement of the trestle in a direction in which a wire is loosened is prevented.

More specifically, the aspect of the disclosure relates to a wire drive conveying apparatus including a guide rail, a conveyance bogie, a wire, a movable trestle, a weight, a spring, and a locking mechanism. The conveyance bogie is configured to slidably engage with the guide rail. The wire is placed along the guide rail and formed to be endless when opposite ends of the wire are connected to the conveyance bogie. The movable trestle is connected to a moving pulley configured to support the wire. The weight is configured to pull the trestle in a direction in which a tensile force is given to the wire. The spring is provided between the conveyance bogie and the trestle. The locking mechanism is configured to permit a movement of the trestle in the direction in which the tensile force is given to the wire and to prevent a movement of the trestle in a direction in which the wire is loosened.

The wire drive conveying apparatus is configured to cause the conveyance bogie to run along the guide rail by pulling the wire.

In this configuration, the trestle to which the moving pulley that supports the wire is connected is pulled by the weight in the direction in which the tensile force is given to the wire, so that the tensile force can be given to the wire all the time. Then, the locking mechanism permits the movement of the trestle in the direction in which the tensile force is given to the wire. Accordingly, in a case where the wire is stretched out due to aged deterioration or the like, the trestle pulled by the weight moves backward just by a stretched amount of the wire, so that a state where the wire is pulled all the time can be automatically maintained.

In the meantime, the locking mechanism prevents the movement of the trestle in the direction in which the wire is loosened. Accordingly, even if the trestle is pulled in the direction in which the wire is sent out (loosened) at the time when the conveyance bogie passes the curve part, the trestle does not move, so that it is possible to restrain the weight that pulls the trestle from moving up and down. Further, in this case, the trestle does not move, but the spring provided between the conveyance bogie and the trestle expands, so that it is possible to secure a wire length necessary for the conveyance bogie to pass the curve part.

As described above, with the above aspect, it is possible to automatically adjust stretch of the wire due to aged deterioration or the like, and it is possible to restrain the weight from moving up and down at the time when the conveyance bogie passes the curve part. This makes it possible to restrain the wire from receiving a damage due to the acceleration of gravity of the weight and to also restrain delay of a stop of a conveyed object.

Further, in the wire drive conveying apparatus, the spring may be provided between the moving pulley and the trestle, and the moving pulley and the trestle may be connected to each other via the spring.

With this configuration, the moving pulley that supports the wire is pulled toward the trestle side by a biasing force of the spring, and the trestle itself is also pulled by the weight to the direction in which the tensile force is given to the wire, so that the tensile force can be given to the wire all the time. Besides, in a case where the conveyance bogie passes the curve part, the trestle does not move, but the spring that connects the moving pulley supporting the wire to the trestle expands, so that the wire is sent out, thereby making it possible to secure a wire length necessary for the conveyance bogie to pass the curve part.

Further, in the wire drive conveying apparatus, the spring may be provided between the conveyance bogie and the moving pulley, and the conveyance bogie and the wire may be connected to each other via the spring.

With this configuration, in a case where the conveyance bogie passes the curve part, the spring that connects the conveyance bogie to the wire expands, thereby making it possible to secure a wire length necessary for the conveyance bogie to pass the curve part.

Further, in the wire drive conveying apparatus, the locking mechanism may be a ratchet mechanism including ratchet teeth and ratchet lugs and configured such that, when the ratchet lugs move relative to the ratchet teeth toward the direction in which the tensile force is given to the wire, the ratchet lugs do not engage with the ratchet teeth, and when the ratchet lugs move relative to the ratchet teeth toward the direction in which the wire is loosened, the ratchet lugs engage with the ratchet teeth. The ratchet lugs may be attached to the trestle.

With this configuration, with a simple structure using the ratchet mechanism having the ratchet teeth and the ratchet lugs, it is possible to achieve a locking mechanism configured to permit the movement of the trestle in the direction in which the tensile force is given to the wire and to prevent the movement of the trestle in the direction in which the wire is loosened.

Further, in the wire drive conveying apparatus, the locking mechanism may include an eccentric cam configured to switch between an unlocked state where the movement in the direction in which the tensile force is given to the wire is permitted and a locked state where the movement in the direction in which the wire is loosened is prevented.

With this configuration, with a simpler structure using the eccentric cam that establishes the locked state by a wedge effect, it is possible to achieve a locking mechanism configured to permit the movement of the trestle in the direction in which the tensile force is given to the wire and to prevent the movement of the trestle in the direction in which the wire is loosened.

Further, in the wire drive conveying apparatus, a driving device configured to wind the wire may be provided in a first end of the guide rail, and a take-up mechanism including the moving pulley, the trestle, and the weight may be provided in a second end of the guide rail.

With this configuration, by providing the driving device and the take-up mechanism in the first and second ends of the guide rail, it is possible to restrain an increase of the number of components such as an unnecessary pulley.

As described above, with the wire drive conveying apparatus of the disclosure, it is possible to automatically adjust stretch of the wire due to aged deterioration or the like, and it is also possible to restrain the weight from moving up and down at the time when the conveyance bogie passes the curve part.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to the drawings, the following describes embodiments to carry out the disclosure.

Embodiment 1

Wire Drive Conveying Apparatus

Figure 1:
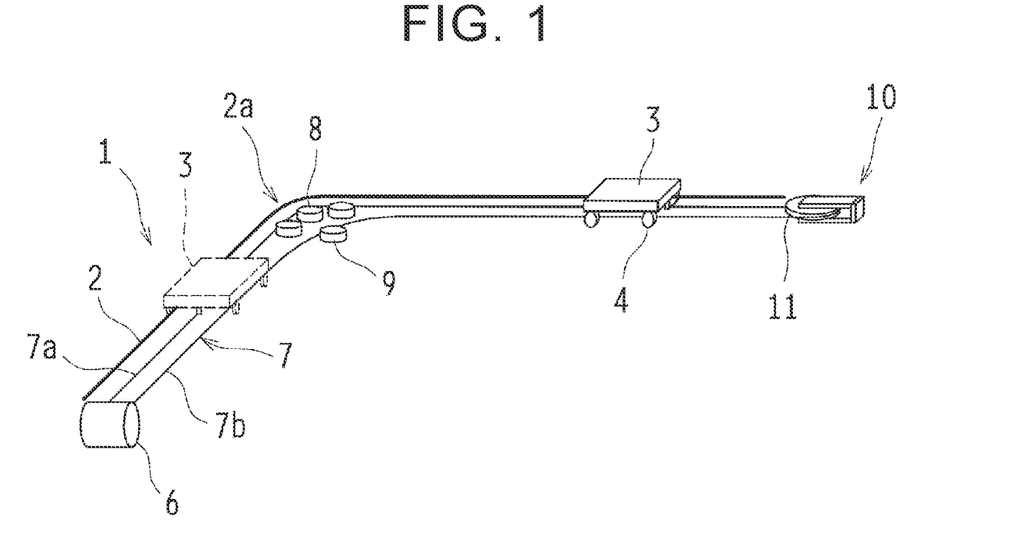
FIG. 1 is a view schematically illustrating a wire drive conveying apparatus according to Embodiment 1 of the disclosure.
Figure 2A:
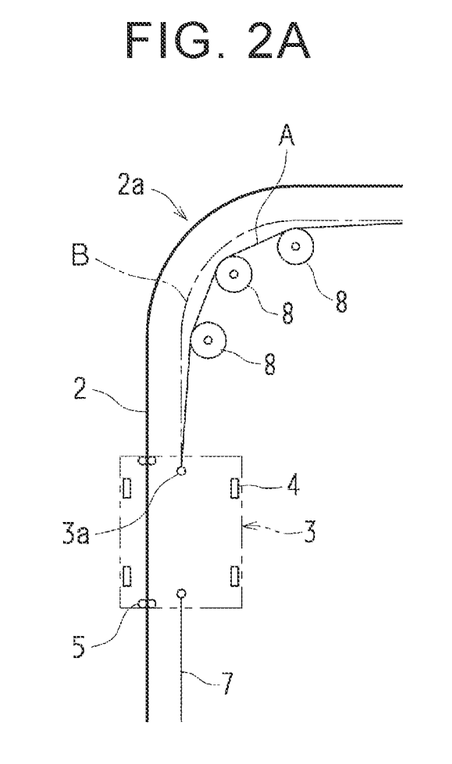
FIG. 2A is a plan view schematically illustrating a curve part in the wire drive conveying apparatus and is a view illustrating a state before a conveyance bogie passes the curve part.
Figure 2B:
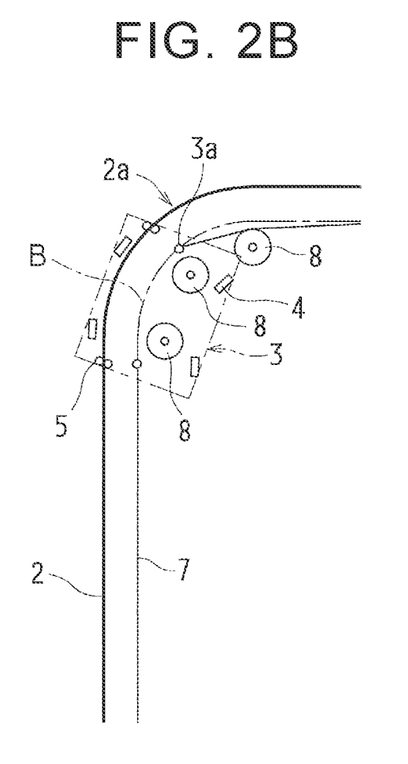
FIG. 2B is a view illustrating a state where the conveyance bogie is passing the curve part.

FIG. 1 is a view schematically illustrating a wire drive conveying apparatus 1 according to the present embodiment. FIG. 2A is a plan view schematically illustrating a curve part 2*a* in the wire drive conveying apparatus 1 and is a view illustrating a state before a conveyance bogie 3 passes the curve part 2*a*. FIG. 2B is a view illustrating a state where the conveyance bogie 3 is passing the curve part 2*a*. Note that, in FIG. 2A, and FIG. 2B, a part of the conveyance bogie 3 is indicated by a virtual line to easily understand the figures.

As illustrated in FIG. 1, the wire drive conveying apparatus 1 includes a guide rail 2, a conveyance bogie 3, a driving device 6, a wire 7, pulleys 8, 9 for wire routing, and a take-up mechanism 10. The wire drive conveying apparatus 1 pulls, by the driving device 6, the wire 7 placed along the guide rail 2, so that the conveyance bogie 3 runs along the guide rail 2.

In the example illustrated in FIG. 1, the guide rail 2 is formed to have a generally L-shape in a plan view so as to have one curve part 2*a*, and the guide rail 2 is fixed onto a running path surface. As illustrated in FIG. 2A, the conveyance bogie 3 includes four caster wheels 4, and two pairs of front and rear guide rings 5. The conveyance bogie 3 slidably engages with the guide rail 2 such that the guide rail 2 is sandwiched between the front and rear guide rings 5. Further, the conveyance bogie 3 is connected to the wire 7 at front and rear connecting portions 3a provided on the center line of the conveyance bogie 3.

The wire 7 is formed to be endless when its opposite ends are connected to the connecting portions 3a of the conveyance bogie 3. The driving device 6 is provided in a first end of the guide rail 2 and configured such that, when the driving device 6 rotates in a normal direction, a wire 7b is sent off while a wire 7a is wound, for example, and when the driving device 6 rotates in a reverse direction, the wire 7b is wound while the wire 7a is sent off, for example. The take-up mechanism 10 is provided in a second end of the guide rail 2. The take-up mechanism 10 includes a moving pulley 11, and the wire 7 is wound around the moving pulley 11. Three pulleys 8 for wire routing are placed inside the curve part 2a of the guide rail 2 so as to correspond to the curve part 2a. Further, one pulley 9 for wire routing is placed further inwardly from the pulleys 8.

As illustrated in FIG. 1 and FIG. 2A, in the endless wire 7, the wire 7a extending from the driving device 6 is provided over the three pulleys 8 and then wound around the moving pulley 11 of the take-up mechanism 10, and the wire 7b extending from the moving pulley 11 is provided around the pulley 9 and then returns to the driving device 6. Hereby, the endless wire 7 is placed in a generally L-shape in a plan view along the guide rail 2.

In the wire drive conveying apparatus 1 configured as such, when the driving device 6 rotates in the normal direction, for example, the wire 7b is sent off while the wire 7a is wound up, so that the conveyance bogie 3 is pulled from the take-up mechanism 10 side to the driving device 6 side. In the meantime, when the driving device 6 rotates in the reverse direction, for example, the wire 7b is wound up while the wire 7a is sent off, so that the conveyance bogie 3 is pulled from the driving device 6 side to the take-up mechanism 10 side. Hereby, in the wire drive conveying apparatus 1, the conveyance bogie 3 runs along the guide rail 2 from the take-up mechanism 10 side to the driving device 6 side or from the driving device 6 side to the take-up mechanism 10 side, and when the conveyance bogie 3 reaches a predetermined position, the rotation of the driving device 6 is stopped to stop the conveyance bogie 3, so that delivery of a conveyed object is performed.

As illustrated in FIG. 2B, when the conveyance bogie 3 passes the curve part 2a, the conveyance bogie 3 moves along the shape of the guide rail 2, because the conveyance bogie 3 engages with the guide rail 2 by the front and rear guide rings 5. As a result, the connecting portions 3a provided on the center line of the conveyance bogie 3 go outside the three pulleys 8, so that the connecting portions 3a do not hit the pulleys 8. In this case, a wire length corresponding to a difference between a length A of the wire 7 provided over the pulleys 8 and a running path length B of the conveyance bogie 3 is required.

Take-Up Mechanism

In the meantime, in the wire drive conveying apparatus 1, the wire 7 largely stretches in the early stage of beginning of use, and the wire 7 is stretched out due to aged deterioration after that. Accordingly, it is necessary to automatically adjust stretch of the wire 7 in order to restrain slack of the endless wire 7. In view of this, the wire drive conveying apparatus 1 of the present embodiment includes the take-up mechanism 10 illustrated in FIG. 3 as a mechanism configured to automatically adjust the stretch of the wire 7.

Figure 9:
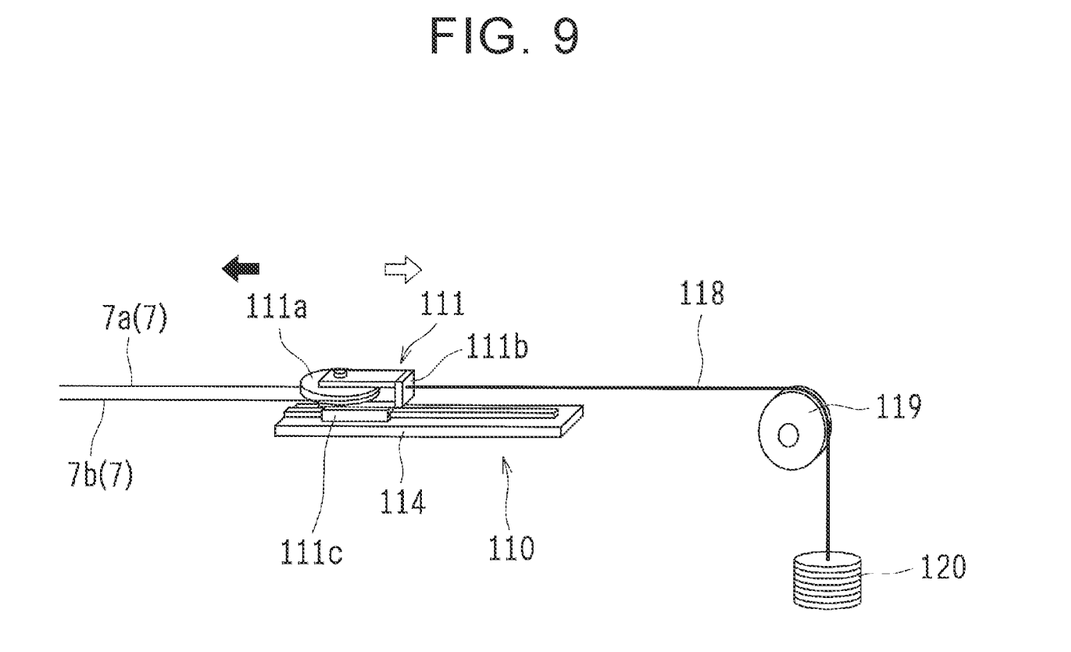
FIG. 9 is a view schematically illustrating a take-up mechanism in the related art.

Here, for easy understanding of the disclosure, a take-up mechanism 110 in the related art will be described before the take-up mechanism 10 is described. FIG. 9 is a view schematically illustrating the take-up mechanism 110 in the related art. As illustrated in FIG. 9, the take-up mechanism 110 in the related art includes a moving pulley 111, a rail 114, a hanging wire 118, a fixed pulley 119, and a weight 120.

The moving pulley 111 includes a disk portion 111a around which the wire 7 is wound, a link portion 111b configured to rotatably support the disk portion 111a, and a guide portion 111c provided in the link portion 111b. The moving pulley 111 slidably engages with the rail 114 fixed on the running path surface via the guide portion 111c. The hanging wire 118 is attached to the link portion 111b. The hanging wire 118 is wound around the fixed pulley 119, and the weight 120 is attached to a tip end of the hanging wire 118.

In such a configuration, in the take-up mechanism 110 in the related art, the moving pulley 111 that supports the wire 7 is connected to the weight 120 via the hanging wire 118 and the fixed pulley 119. Accordingly, when the wire 7 is stretched out due to aged deterioration or the like, the moving pulley 111 pulled by the weight 120 moves along the rail 114 toward a direction indicated by a blank arrow in FIG. 9 just by a stretched amount of the wire 7, so that a state where the wire 7 is pulled all the time is automatically maintained.

At the time when the conveyance bogie 3 passes the curve part 2a, the take-up mechanism 110 in the related art may have the following problem. That is, when the conveyance bogie 3 passes the curve part 2a, the wire length corresponding to the difference between the length A of the wire 7 provided over the pulleys 8 and the running path length B of the conveyance bogie 3 is required as described above. In the take-up mechanism 110 in the related art, the moving pulley 111 moves along the rail 114 toward a direction indicated by a black arrow in FIG. 9, so that the wire 7 is sent off and a necessary wire length is secured.

However, along with the movement of the moving pulley 111 to the direction indicated by the black arrow in FIG. 9, the weight 120 is suddenly lifted. As a result, the weight 120 moves up and down after the conveyance bogie 3 has passed the curve part 2a, and the acceleration of gravity of the weight 120 is added to the wire 7 at the time when the weight 120 moves down. This may damage the wire 7. Further, once the weight 120 starts to move up and down, it takes time until the weight 120 stands still. This requires time to stop the conveyance bogie 3, so that a stop of a conveyed object delays in some cases.

Figure 3:
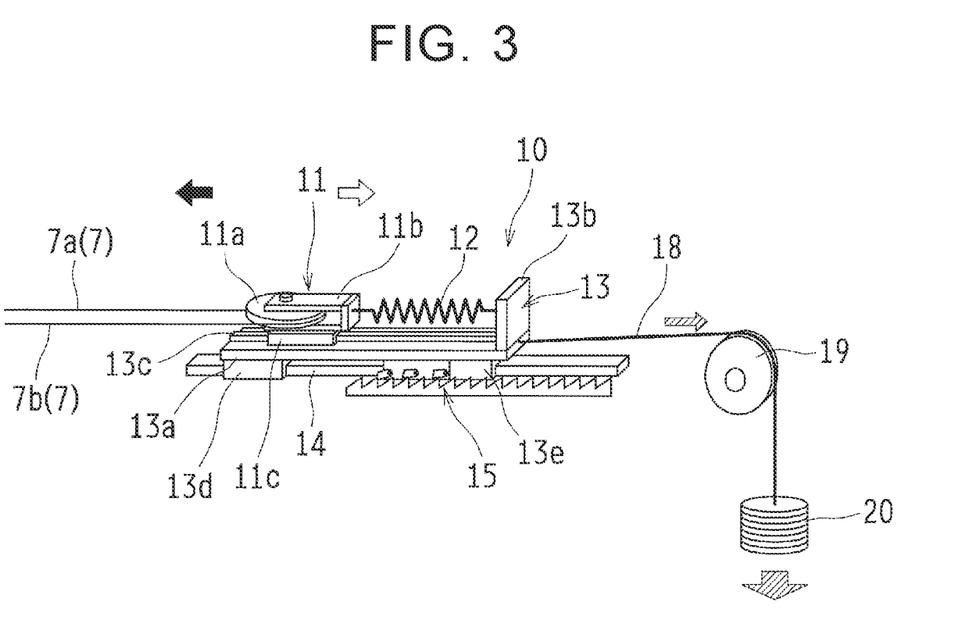
FIG. 3 is a view schematically illustrating a take-up mechanism.

In view of this, in the take-up mechanism 10 of the present embodiment, the moving pulley 11 is connected to a weight 20 with a spring 12, and due to extension of the spring 12, a wire length required at the time when the conveyance bogie 3 passes the curve part 2a is secured, and further, a movement of the weight 20 in a direction in which the wire 7 is loosened is prevented.

More specifically, as illustrated in FIG. 3, the take-up mechanism 10 of the present embodiment includes the moving pulley 11, the spring 12, a trestle 13, the rail 14, a locking mechanism 15, a hanging wire 18, a fixed pulley 19, and the weight 20. Note that, in the following description, the left direction in FIG. 3 is assumed the front direction, and the right direction in FIG. 3 is assumed the rear direction for convenience of description.

The moving pulley 11 includes a disk portion 11a around which the wire 7 is wound, a link portion 11b configured to rotatably support the disk portion 11a, and a guide portion 11c provided in the link portion 11b, so that the moving pulley 11 supports the wire 7.

The trestle 13 includes a rectangular-plate-shaped body portion 13a extending in the front-rear direction, a vertical wall portion 13b provided in a rear end part of the body portion 13a, a rail portion 13c provided on a top face of the body portion 13a in a projecting manner and extending in the front-rear direction, and a front guide portion 13d and a rear guide portion 13e provided below the body portion 13a.

The guide portion 11c of the moving pulley 11 engages with the rail portion 13c, so that the guide portion 11c is slidable relative to the trestle 13 in the front-rear direction. Further, the disk portion 11a is attached to a front end of the link portion 11b of the moving pulley 11. A rear end of the link portion 11b is connected to the trestle 13 via the spring 12 attached to the vertical wall portion 13b. Hereby, the moving pulley 11 is movable relative to the trestle 13 in the front-rear direction.

As such, the trestle 13 to which the moving pulley 11 is attached slidably in the front-rear direction is also slidable relative to the rail 14 in the front-rear direction such that the front guide portion 13d and the rear guide portion 13e engage with the rail 14 fixed onto the running path surface and extending in the front-rear direction.

Further, the hanging wire 18 is attached to the trestle 13, the hanging wire 18 is provided around the fixed pulley 19, and the weight 20 is attached to a tip end of the hanging wire 18. Hereby, the trestle 13 is pulled in a direction (the rear direction) in which a tensile force is given to the wire 7 by the weight 20 as indicated by a hatching arrow in FIG. 3.

Figure 4:
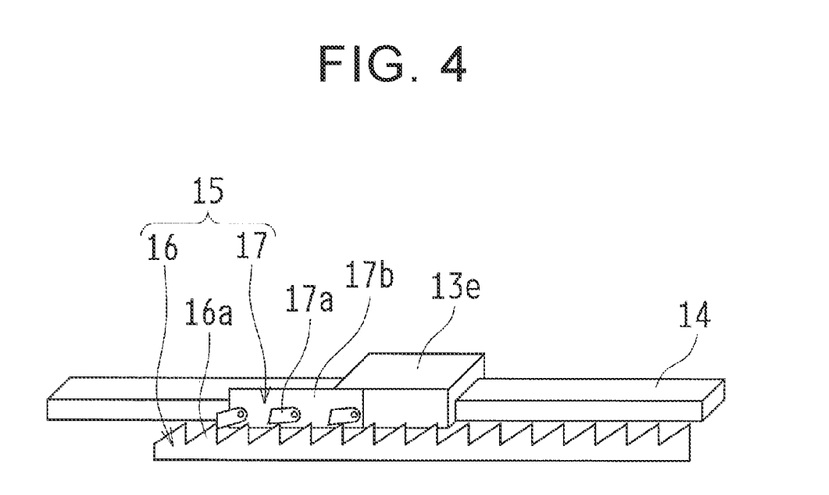
FIG. 4 is an enlarged view schematically illustrating a locking mechanism.

FIG. 4 is an enlarged view schematically illustrating the locking mechanism 15. As illustrated in FIG. 4, the locking mechanism (dragging preventing means) 15 is configured as a ratchet mechanism including a first locking member 16 fixed on the running path surface and having ratchet teeth 16a on an upper part of the first locking member 16, and a second locking member 17 having ratchet lugs 17a. The ratchet lugs 17a are pivotably supported by a plate 17b attached to the rear guide portion 13e. When the ratchet lugs 17a move rearward relative to the ratchet teeth 16a, the ratchet lugs 17a do not engage with the ratchet teeth 16a, and when the ratchet lugs 17a move forward relative to the ratchet teeth 16a, the ratchet lugs 17a engage with the ratchet teeth 16a. When the ratchet lugs 17a have engaged with the ratchet teeth 16a, the ratchet lugs 17a restrict a forward movement of the trestle 13. Hereby, the locking mechanism 15 permits a movement of the trestle 13 in the direction (the rear direction) in which the tensile force is given to the wire 7, the direction being a direction in which the ratchet lugs 17a do not engage with the ratchet teeth 16a. In the meantime, the locking mechanism 15 prevents a movement of the trestle 13 in a direction (the front direction) in which the wire 7 is loosened, the direction being a direction in which the ratchet lugs 17a engage with the ratchet teeth 16a.

In the take-up mechanism 10 configured as described above, as indicated by a blank arrow in FIG. 3, the moving pulley 11 that supports the wire 7 is pulled toward the trestle 13 side by a biasing force of the spring 12, and the trestle 13 itself is pulled by the weight 20 in the direction in which the tensile force is given to the wire 7, so that the tensile force can be given to the wire 7 all the time. The locking mechanism 15 permits the movement of the trestle 13 in the direction (the rear direction) in which the tensile force is given to the wire 7. Accordingly, in a case where the wire 7 is stretched out due to aged deterioration or the like, the trestle 13 pulled by the weight 20 moves backward just by a stretched amount of the wire 7, so that a state where the wire 7 is pulled all the time can be automatically maintained.

In the meantime, the locking mechanism 15 prevents the movement of the trestle 13 in the direction (the front direction) in which the wire 7 is loosened. Accordingly, even if the trestle 13 is pulled via the moving pulley 11 and the spring 12 in the direction in which the wire 7 is sent out (loosened) at the time when the conveyance bogie 3 passes the curve part 2a, the trestle 13 does not move, so that it is possible to restrain the weight 20 connected to the trestle 13 via the hanging wire 18 from moving up and down. As such, the weight 20 is restrained from moving up and down, thereby making it possible to restrain the wire 7 from receiving a damage due to the acceleration of gravity of the weight 20 and to also restrain delay of the stop of the conveyed object.

Further, when the conveyance bogie 3 passes the curve part 2a, the trestle 13 does not move, but the spring 12 that connects the moving pulley 11 to the trestle 13 expands, so that the moving pulley 11 that supports the wire 7 moves as indicated by a black arrow in FIG. 3 and the wire 7 is sent off, thereby making it possible to secure a wire length necessary for the conveyance bogie 3 to pass the curve part 2a.

Accordingly, with the wire drive conveying apparatus 1 of the present embodiment, including such a take-up mechanism 10, it is possible to automatically adjust the stretch of the wire 7 due to aged deterioration or the like, and it is also possible to restrain the weight 20 from moving up and down at the time when the conveyance bogie 3 passes the curve part 2a.

Embodiment 2

The present embodiment is different from Embodiment 1 in the structure of the take-up mechanism and in that a spring is provided between the conveyance bogie 3 and the moving pulley. In the following description, the same constituent as in Embodiment 1 has the same reference sign as in Embodiment 1, and its detailed description is omitted. The following mainly describes points different from Embodiment 1.

Figure 5:
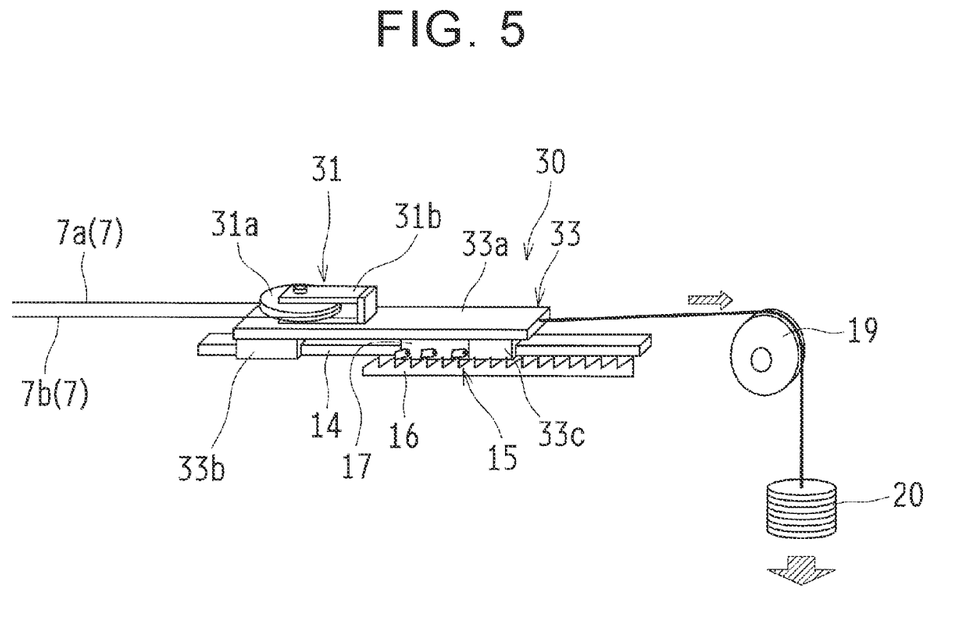
FIG. 5 is a view schematically illustrating a take-up mechanism according to Embodiment 2 of the disclosure.

FIG. 5 is a view schematically illustrating a take-up mechanism 30 of the present embodiment. As illustrated in FIG. 5, the take-up mechanism 30 of the present embodiment includes a moving pulley 31, a trestle 33, the rail 14, the locking mechanism 15, the hanging wire 18, the fixed pulley 19, and the weight 20, but differently from Embodiment 1, the take-up mechanism 30 does not include the spring 12. Note that, in the following description, the left direction in FIG. 5 is assumed the front direction, and the right direction in FIG. 5 is assumed the rear direction for convenience of description.

The moving pulley 31 includes a disk portion 31a around which the wire 7 is wound, and a link portion 31b configured to rotatably support the disk portion 31a, so that the moving pulley 31 supports the wire 7.

The trestle 33 includes a rectangular-plate-shaped body portion 33a extending in the front-rear direction, and a front guide portion 33b and a rear guide portion 33c provided below the body portion 33a.

The moving pulley 31 is immovable relative to the trestle 33 such that the link portion 31b is fixed to the body portion 33a.

In the meantime, the front guide portion 33b and the rear guide portion 33c engage with the rail 14, so that the trestle 33 is slidable relative to the rail 14 in the front-rear direction.

Further, the trestle 33 is pulled in the direction (the rear direction) in which the tensile force is given to the wire 7 by the weight 20 as indicated by a hatching arrow in FIG. 5.

Further, the second locking member 17 of the locking mechanism 15 is attached to the rear guide portion 33c of the trestle 33. Hereby, while the locking mechanism 15 permits the movement of the trestle 33 in the direction (the rear direction) in which the tensile force is given to the wire 7, the locking mechanism 15 prevents the movement of the trestle 33 in the direction (the front direction) in which the wire 7 is loosened.

Figure 6:
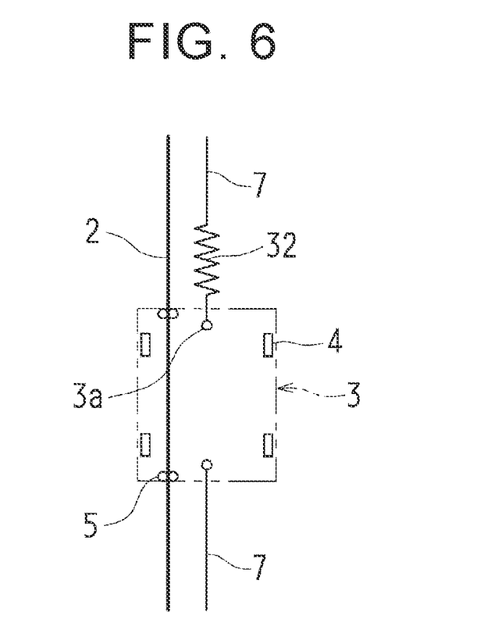
FIG. 6 is a plan view schematically illustrating a conveyance bogie.

FIG. 6 is a plan view schematically illustrating the conveyance bogie 3. Note that, in FIG. 6, a part of the conveyance bogie 3 is indicated by a virtual line to easily understand the figure. The conveyance bogie 3 of the present embodiment is configured such that the connecting portions 3a of the conveyance bogie 3 is connected to a first end of the wire 7 via the spring 32, as illustrated in FIG. 6.

In the take-up mechanism 30 configured as described above, in a case where the wire 7 is stretched out due to aged deterioration or the like, the trestle 33 to which the moving pulley 31 that supports the wire 7 is directly connected is pulled by the weight 20 so as to move backward just by a stretched amount of the wire 7, so that a state where the wire 7 is pulled all the time can be automatically maintained.

In the meantime, the locking mechanism 15 prevents the movement of the trestle 33 in the direction (the front direction) in which the wire 7 is loosened. Accordingly, even if the trestle 33 is pulled in the direction in which the wire 7 is sent out (loosened) at the time when the conveyance bogie 3 passes the curve part 2a, the trestle 33 does not move, thereby making it possible to restrain the weight 20 from moving up and down.

Further, at the time when the conveyance bogie 3 passes the curve part 2a, the trestle 33 does not move, but the spring 32 that connects the conveyance bogie 3 to the wire 7 expands, so that it is possible to secure a wire length necessary for the conveyance bogie 3 to pass the curve part 2a.

Embodiment 3

The present embodiment is different from Embodiment 1 in that a locking mechanism is constituted not by a ratchet mechanism but by an eccentric cam. The following mainly describes points different from Embodiment 1.

Figure 7:
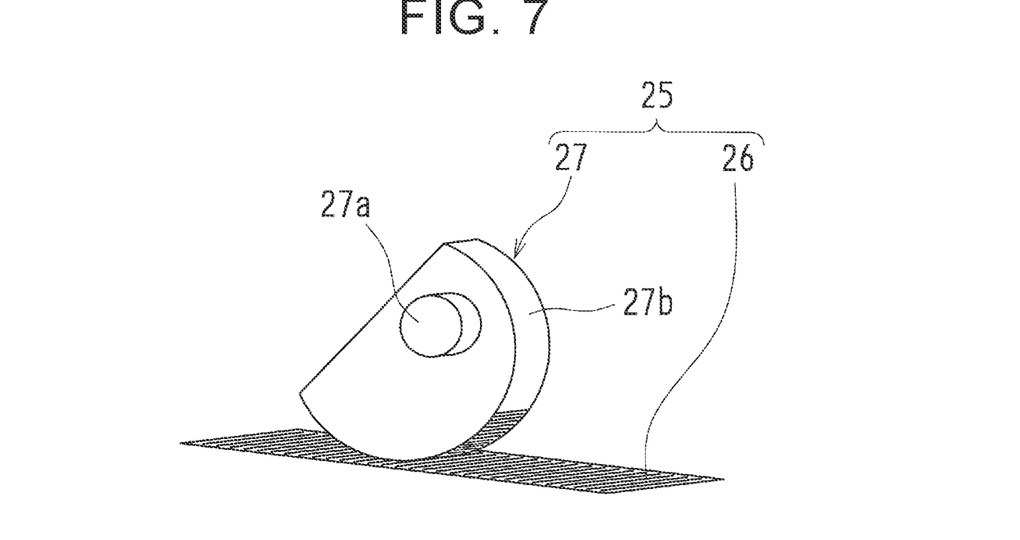
FIG. 7 is a view schematically illustrating a locking mechanism according to Embodiment 3 of the disclosure.
Figure 8A:
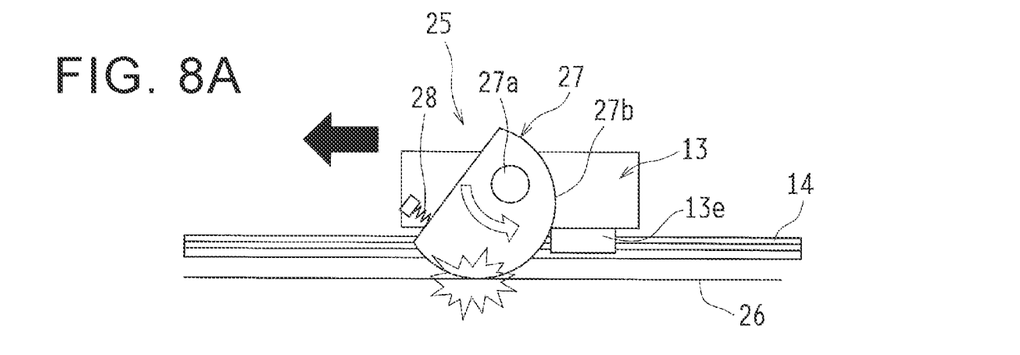
FIG. 8A is a view to schematically describe an operation of the locking mechanism and is a view illustrating a case where the conveyance bogie passes the curve part.
Figure 8B:
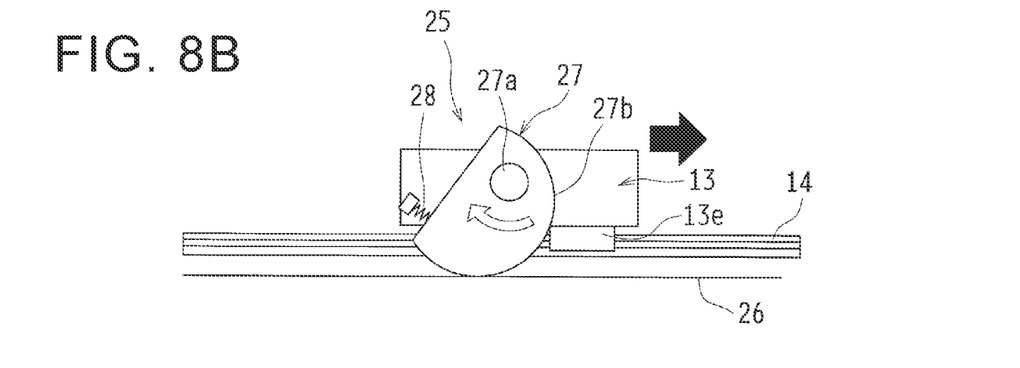
FIG. 8B is a view illustrating a case except the case where the conveyance bogie passes the curve part.

FIG. 7 is a view schematically illustrating a locking mechanism 25 according to the present embodiment. FIG. 8A is a view to schematically describe an operation of the locking mechanism 25 and is a view illustrating a case where the conveyance bogie 3 passes the curve part 2a. FIG. 8B is a view illustrating a case except the case where the conveyance bogie 3 passes the curve part 2a.

The locking mechanism (dragging preventing means) 25 inclds a sheet member 26 fixed on the running path surface and having minute projections and recessions formed on a top face of the sheet member 26, and an eccentric cam 27 pivotably supported by the trestle 13 via a shaft portion 27a and having minute projections and recessions formed on a circular arc portion 27b to mesh with the minute projections and recessions of the sheet member 26. Note that, as illustrated in FIG. 8A and FIG. 8B, the eccentric cam 27 is always biased counterclockwise around the shaft portion 27a by a spring 28.

In the locking mechanism 25 configured as described above, when the trestle 13 is pulled in the direction (the front direction) in which the wire 7 is loosened as indicated by a black arrow in FIG. 8A at the time when the conveyance bogie 3 passes the curve part 2a, the trestle 13 is locked due to a wedge effect of the eccentric cam 27 that is to rotate counterclockwise as indicated by a blank arrow in FIG. 8A. Hereby, similarly to the locking mechanism 15, the movement of the trestle 13 in the direction in which the wire 7 is loosened is prevented. Accordingly, similarly to Embodiment 1, it is possible to restrain the weight 20 connected to the trestle 13 from moving up and down, thereby making it possible to restrain the wire 7 from receiving a damage and to also restrain the stop of the conveyed object from delaying.

Further, in the locking mechanism 25 of the present embodiment, in a case where the wire 7 is stretched out due to aged deterioration or the like, the trestle 13 is pulled rearward by the weight 20 as indicated by a black arrow in FIG. 8B, so that the eccentric cam 27 rotates clockwise as indicated by a blank arrow in FIG. 8B. Hereby, the locking by the wedge effect is released. Hereby, similarly to the locking mechanism 15, the movement of the trestle 13 in the direction (the rear direction) in which the tensile force is given to the wire 7 is permitted. Accordingly, similarly to Embodiment 1, the trestle 13 moves backward just by a stretched amount of the wire 7, thereby making it possible to automatically adjust the stretch of the wire 7 due to aged deterioration or the like.

Other Embodiments

The disclosure is not limited to the above embodiments and can be carried out in other various forms without departing from the spirit or main feature of the disclosure.

In each of the above embodiments, the guide rail 2 is formed into a generally L-shape in a plan view so as to have one curve part 2a. However, the disclosure is not limited to this, and the guide rail may be formed into a generally S-shape in a plan view so as to have two curve parts, for example.

Further, in Embodiment 3, the locking mechanism 15 in the take-up mechanism 10 of Embodiment 1 is replaced with the locking mechanism 25 including the eccentric cam 27. However, the disclosure is not limited to this, and the locking mechanism 15 in the take-up mechanism 30 of Embodiment 2 may be replaced with the locking mechanism 25 including the eccentric cam 27.

Thus, the above embodiments are just examples in every respect and must not be interpreted restrictively. Further, modifications and alterations belonging to an equivalent range of Claims are all included in the disclosure.

With the disclosure, it is possible to adjust stretch of a wire due to aged deterioration or the like, and it is also possible to restrain a weight from moving up and down at the time when a conveyance bogie passes a curve. Accordingly, the disclosure is extremely useful when the disclosure is applied to a wire drive conveying apparatus.

What is claimed is:

1. A wire drive conveying apparatus comprising:
   a guide rail;
   a conveyance bogie configured to slidably engage with the guide rail;
   a wire placed along the guide rail and formed to be endless when opposite ends of the wire are connected to the conveyance bogie;
   a movable trestle connected to a moving pulley configured to support the wire;
   a weight configured to pull the trestle in a direction in which a tensile force is given to the wire;

a spring provided between the conveyance bogie and the trestle; and a locking mechanism configured to permit a movement of the trestle in the direction in which the tensile force is given to the wire and to prevent a movement of the trestle in a direction in which the wire is loosened, wherein the wire drive conveying apparatus is configured to cause the conveyance bogie to run along the guide rail by pulling the wire.

2. The wire drive conveying apparatus according to claim 1, wherein:

the spring is provided between the moving pulley and the trestle; and the moving pulley and the trestle are connected to each other via the spring.

3. The wire drive conveying apparatus according to claim 1, wherein:

the spring is provided between the conveyance bogie and the moving pulley; and the conveyance bogie and the wire are connected to each other via the spring.

4. The wire drive conveying apparatus according to claim 1, wherein:

the locking mechanism is a ratchet mechanism including ratchet teeth and ratchet lugs and configured such that, when the ratchet lugs move relative to the ratchet teeth toward the direction in which the tensile force is given to the wire, the ratchet lugs do not engage with the ratchet teeth, and when the ratchet lugs move relative to the ratchet teeth toward the direction in which the wire is loosened, the ratchet lugs engage with the ratchet teeth; and the ratchet lugs are attached to the trestle.

5. The wire drive conveying apparatus according to claim 1, wherein the locking mechanism includes an eccentric cam configured to switch between an unlocked state where the movement in the direction in which the tensile force is given to the wire is permitted and a locked state where the movement in the direction in which the wire is loosened is prevented.

6. The wire drive conveying apparatus according to claim 1, wherein:

a driving device configured to wind the wire is provided in a first end of the guide rail; and a take-up mechanism including the moving pulley, the trestle, and the weight is provided in a second end of the guide rail.

7. The wire drive conveying apparatus according to claim 1, wherein the guide rail has a curved curve part.

* * * * *